United States Patent ... [11] 3,578,844

[72] Inventors Donald Churchill
  Kettering;
  James V. Cartmell, Dayton, Ohio
[21] Appl. No. 707,823
[22] Filed Feb. 23, 1968
[45] Patented May 18, 1971
[73] Assignee The National Cash Register Company
  Dayton, Ohio

[54] RADIATION SENSITIVE DISPLAY DEVICE CONTAINING ENCAPSULATED CHOLESTERIC LIQUID CRYSTALS
17 Claims, 6 Drawing Figs.
[52] U.S. Cl. ............................................. 350/160,
  252/316, 313/89, 313/116
[51] Int. Cl. ........................................... B01g 13/00,
  H01j 29/10, G02f 1/34
[50] Field of Search............................................. 313/108;
  315/246; 252/301.2 (Inquired), 216 (Inquired);
  250/71, 80, 83.3; 350/160 (Inquired); 252/316;
  23/230 (LC)

[56] References Cited
UNITED STATES PATENTS
3,114,836 12/1963 Ferguson et al. ............... 250/83
3,265,630 8/1966 Jensen........................... 252/316
3,415,991 12/1968 Asars............................. 250/83
3,430,088 2/1969 Beswick ........................ 313/108
3,440,471 4/1969 Baczewski et al............. 313/108
3,441,513 4/1969 Woodmansee................ 250/83
3,322,485 5/1967 Williams........................ 350/160

FOREIGN PATENTS
1,123,117 8/1968 Great Britain................ 250/213
1,138,590 1/1969 Great Britain................ 350/160
1,484,584 5/1967 France ......................... 350/160

OTHER REFERENCES
J. H. Muller— Article on " Effects of Electric Fields on Cholesterol Nonanoate Liquid Crystals" in Vol. 2, of " Molecular Crystals" 1966 by Gordon and Breach Science Publishers in Great Britain. pages 167— 188 (pages 167 to 169 are sufficient for this case).

Primary Examiner—John Kominski
Assistant Examiner—V. Lafranchi
Attorneys—E. Frank McKinney and Joseph P. Burke

ABSTRACT: This disclosure is directed to articles of manufacture, chiefly display devices, containing encapsulated cholesteric liquid crystals which change color or shade of color not only upon application of an electric potential but also upon removal of the field. The image produced has a comparable outline to that of the path of the electric field. Three chromatic states are evident, the normal color (before the electric potential is applied), the color given off when the electric field is applied, and the color observed when the electric field is removed. All three chromatic states are readily discernible from one another. The encapsulation of the cholesteric liquid crystal provides an unusual advantage regarding electric field behavior because the third chromatic state (electric potential removed) has a much greater longevity with the encapsulated material versus unencapsulated material of identical composition. Other advantages are also discussed.

PATENTED MAY 18 1971 3,578,844

INVENTORS
DONALD CHURCHILL &
JAMES V. CARTMELL

BY Joseph P. Burke
E. Frank McKinney

THEIR ATTORNEYS

RADIATION SENSITIVE DISPLAY DEVICE CONTAINING ENCAPSULATED CHOLESTERIC LIQUID CRYSTALS

The present invention is directed to an article of manufacture for utilizing an electric field to obtain an easily-discernible, stable, and optionally either comparatively permanent or readily heat-eraseable chromatic (color and/or reflectance, viz, reflective intensity) representation of comparable outline to said electric field. Since the chromatic representation is stable, it can serve a storage (memory) function. One of the particularly advantageous features of the present invention is that the chromatic representation can be generated by a one-shot signal output, viz, an electronic computer output signal, a single sweep signal such as a radar scan, a display panel where information may be entered once for an extended period storage such as an air terminal schedule display.

Furthermore, the chromatic representation in the color stable (storage) state is capable of representing a fixed body or state of information which can be retrieved and examined readily without requiring continuous electric field potential, e.g., continuous potential such as that obtained from an electron gun, e.g., cathode-ray tube, using conventional electronic computer equipment.

The article of this invention comprises, in its essential components, a pair of spaced electrodes with an encapsulated cholesteric liquid crystalline member located in such a position that the electrodes impose an electric potential on said liquid crystal member. Usually the electrodes are positioned such that the first electrode (the electrode closer to the viewing agency, e.g., eyes of the viewer) and second electrode (the electrode more remote from the viewing agency, e.g., viewer's eyes) are in the electric field-generating proximity to one another and the intermediate encapsulated cholesteric liquid crystalline member can, but need not, be in contact with the first and/or second electrode. Both direct current and alternating current can be employed to produce the electric field. The encapsulated cholesteric liquid crystalline member can be composed of a single capsule of cholesteric liquid crystalline material, but usually said member is composed of a plurality (and preferably a profusion) of capsules containing cholesteric liquid crystalline material. The term "liquid crystal," as used herein, is employed in the generic, art-recognized sense to mean the state of matter often referred to as a mesophase, wherein the material exhibits flow properties associated with a liquid state but demonstrates long range ordering characteristics of a crystal. The cholesteric liquid crystal refers to a particular type of mesophase most often demonstrated by esters of cholesterol. Many of the cholesteric liquid crystals exhibit a reflective scattering of light giving them an iridescent appearance. The encapsulated cholesteric liquid crystalline member can be, and usually is, composed of a mixture of materials which form a cholesteric liquid crystal; but at least one of the materials in the cholesteric liquid crystalline phase must be chromatically responsive to an electric field of the requisite intensity. Moreover, so long as the encapsulated cholesteric liquid crystalline member is located intermediate (between) the electric field-imposing electrodes, the direction at which the field is applied to said member, viz, perpendicular or essentially parallel to the direction of viewing is immaterial.

While the first and second electrodes need not be (and usually are not) coextensive throughout their entire extent and the encapsulated cholesteric liquid crystalline member need not be in direct contact with either or both electrodes; it is necessary for both the first and second electrodes to be close enough to one another and to the intermediate encapsulated cholesteric liquid crystalline member to enable the formation of an electric field between the first and second electrodes. For most purposes, the cholesteric liquid crystalline member is composed of or contains a cholesteric liquid crystalline material which is chromatically responsive to an electric field of from about 10,000 to about 1,000,000 volts per centimeter of thickness of the encapsulated cholesteric liquid crystalline member. By "chromatically responsive" is meant that the cholesteric liquid crystalline material (present in the encapsulated cholesteric liquid crystalline member) must exhibit either an apparent change in color and/or reflective intensity (as viewed from incident white light) upon application of an electrical field of the above specified requisite intensity thereto. Hence the term "chromatic response" is intended to include both changes (shift of wavelength) in color and changes in intensity of reflectance of the same color so that it appears different in color or shade of color from the previous color state(s). Thus, as used herein, a change in color is synonymous with a change in reflective intensity and vice versa. The term "apparent" is employed to denote that the color effect induced or brought about by the electric field, or subsequent to its application, is different from the preexisting (natural) color or absence thereof present in the liquid crystals, per se. Usually, the electric field employed will have an intensity ranging from about 20,000 to 200,000 volts per centimeter of thickness of the encapsulated cholesteric liquid crystalline member.

According to one preferred embodiment of this invention, the encapsulated cholesteric liquid crystalline member is incorporated in and/or on a polymeric matrix or base, which is in direct contact with both the transparent first electrode and the second electrode. Thus it has been found advantageous and practical to provide the encapsulated cholesteric liquid crystal member in the form of a polymeric film, sheet, layer or coating containing the encapsulated cholesteric liquid crystals present in and/or on the polymeric matrix film, sheet, layer or coating. Basically there are two reasons for this. One reason is that the presence of the polymeric matrix enables better adhesion between the encapsulated cholesteric liquid crystal member and the first and second electrodes or comparable contiguous surfaces. Another reason resides in the fact that the presence of the polymeric matrix (which can be controlled to be of uniform and accurate thickness) serves to enhance the optical homogeneity of the chromatic representation (image) observed in the display device. While use of a polymeric matrix to contain the encapsulated cholesteric liquid crystals is preferred, nevertheless the encapsulated cholesteric liquid crystals can be employed as the intermediately located encapsulated cholesteric liquid crystal member, per se, viz, the encapsulated cholesteric liquid crystals with no additional matrix or component in said member. This is feasible and can be accomplished by taping or otherwise providing a containing border around the encapsulated cholesteric liquid crystals to prevent their undesired lateral movement or egress between the first and second electrodes thereby defining a cholesteric liquid crystal member composed of a profusion of individual encapsulated cholesteric liquid crystals having no polymeric matrix, base or binder whatsoever.

ENCAPSULATED CHOLESTERIC LIQUID CRYSTAL MEMBER

While most, if not all, cholesteric liquid crystal materials exhibit chromatic response to electric potential; different cholesteric liquid crystals, and mixtures thereof, respond in varying chromatic contrasts at different electric potential intensity levels. Of course, all changes in shades of color are not equally discernible to the naked eye. For this reason and others, e.g., "blindness" to certain colors and shades of colors; it is within the purview of this invention to use specific color filters and optical sensors to aid in detection of subtle changes in shades of color and convert these subtle changes to more clearly recognizable ones. Hence, while all cholesteric liquid crystals are not equal in chromatic response to electric potential for display purposes when the display is viewed by the naked eye; deficiencies in clearly observable contrast can be compensated for. Nevertheless, for most visual display devices it is preferably to employ cholesteric liquid crystals whose chromatic response is both clearly discernible to the naked eye and in sharp chromatic contrast to its preceding color state.

When an electric field is imposed on the encapsulated cholesteric liquid crystal material, the liquid crystals change color (or reflective intensity) instantaneously to shift from a first chromatic state (that "normal" color state existing prior to the application of an electric field thereto) to a second chromatic state, viz, the chromatic state existing due to the presence of the electric potential. The second chromatic state demonstrates a color (or reflective intensity) different from that of the first chromatic state, and this difference is preferably readily recognizable to the naked eye. Upon removal of the electric field, the color changes from the second chromatic state to a third chromatic state and the color (or reflective intensity) exhibited by the liquid crystal material in the third chromatic state is different from that of the color given off in the second chromatic state and first chromatic state, respectively.

A very surprising and advantageous feature of a preferred embodiment of the present invention resides in the fact that the third chromatic state displays a high stability and permanence colorwise, viz, it does not "fade" back to the first chromatic state. Compared with unencapsulated cholesteric liquid crystals, the encapsulated cholesteric liquid crystals have the ability to retain the third chromatic state in most cases for at least several orders of magnitude of time longer than the unencapsulated material. This ability of the encapsulated cholesteric liquid crystals to retain the permanent chromatic representation or image as defined by the third chromatic state can be employed in storing information for future use.

An example of the difference between the color or reflective intensity between the three chromatic states spoken of hereinabove can be gleaned from the following illustrative example. Using the mixture of cholesteric liquid crystalline materials noted below in Example 1, an original or first chromatic state which is a green color is observed to the naked eye. Then, when the electric potential is applied so as to create an electric field between the first and second electrodes, the second chromatic state produced is a blue-green color quite distinct in appearance to the naked eye from the first chromatic state. Then, when the electric field potential is removed, a third chromatic state is produced which is, to the naked eye, a grey color, which is quite distinct in appearance from both the green of the first chromatic state and the blue-green of the second chromatic state.

Suitable chromatically responsive cholesteric liquid crystal materials include, but are not limited to, the following: cholesteryl halides, e.g., cholesteryl chloride, cholesteryl bromide and cholesteryl iodide, cholesteryl nitrate and other mixed esters of cholesterol and inorganic acids; cholesteryl esters of saturated and unsaturated, substituted and unsubstituted organic acids, esp. cholesteryl esters of $C_1$ to $C_{22}$ aliphatic, monocarboxylic acids, e.g., cholesteryl monanoate, cholesteryl crotonate, cholesteryl chloroformate, cholesteryl chlorodecanoate, cholesteryl chloroeicosanoate, cholesteryl butyrate, cholesteryl caprate, cholesteryl oleate, cholesteryl linolate, cholesteryl linolenate, cholesteryl laurate, cholesteryl erucate, cholesterly myristate, cholesteryl clupanodonate, oleyl cholesteryl carbonate, cholesteryl heptyl carbamate, decyl cholesteryl carbonate; cholesteryl esters of unsubstituted or halogenated aryl, -alkenaryl, -arakenyl, -alkaryl and -aralkyl organic acids, especially cholesteryl esters of those organic acids containing an aromatic moiety and from 7 to 19 carbon atoms, such as, cholesteryl p-chlorobenzoate, cholesteryl cinnamate; cholesteryl ethers, e.g., cholesteryl decyl ether, cholesteryl lauryl ether, cholesteryl oleyl ether, etc.

As mentioned above comparatively pure, chromatically-electric potential responsive encapsulated cholesteric liquid crystalline materials, viz, individual chromatically responsive compounds, can be used; or the chromatically-electric potential responsive materials can be used; or the chromatically-electric potential responsive materials can be used in admixture. The use of such mixtures is actually preferable in most cases because with mixtures the liquid crystalline state can be maintained more readily at ambient room temperatures without requiring extraneous heating. On the other hand when an individual chromatically responsive compound is employed, it is frequently necessary to heat the immediate environment (where the device is to be employed) in order to maintain the material in the liquid crystal state because many such materials are solids at ambient room temperatures. For most applications the chloro derivatives are preferred due to their ability to produce color changes (or shifts in reflective intensity) readily recognizable to the naked eye especially in the second and third chromatic states mentioned hereinabove. Some exemplary mixtures of cholesteric liquid crystal materials which can be employed n accordance with this invention include, but are not limited to, the following: cholesteryl nonanoate, cholesteryl chloride and cholesteryl cinnamate; cholesteryl nonanoate and cholesteryl chloride, cholesteryl nonanoate and cholesteryl bromide; cholesteryl nonanoate, cholesteryl bromide and cholesteryl cinnamate; cholesteryl nonanoate, cholesteryl iodide and cholesteryl cinnamate; cholesteryl nonanoate, cholesteryl iodide and cholesteryl benzoate; cholesteryl nonanoate, cholesteryl chloride and oleyl cholesteryl carbonate; cholesteryl nonanoate, cholesteryl chloride and oleyl cholesteryl carbonate and cholesteryl bromide; oleyl cholesteryl carbonate and cholesteryl iodide, oleyl cholesteryl carbonate and cholesteryl p-chlorobenzoate; etc.

Also, it should be understood that included within the term cholesteric liquid crystalline mixtures are mixtures of two or more individual materials, one or more of which individually does not form a cholesteric liquid crystal phase but which in admixture exhibit a cholesteric liquid crystal phase. Hence, two or three materials which individually are not cholesteric liquid crystals can be employed in accordance with this invention if, when in admixture, they do exhibit cholesteric liquid crystal behavior, viz, they form a mesophase which demonstrates the property of reflection light scattering. One such mixture is cholesteryl nonanoate, oleyl cholesteryl carbonate and cholesterol. The latter material, by itself, does not from a cholesteric liquid crystalline phase, but cholesterol does form a chromatically field responsive mesophase in combination with the other materials.

Various natural and synthetic polymeric materials can be employed to constitute the polymeric matrix, layer, sheet, film or coating in and/or upon which the encapsulated cholesteric liquid crystal material is located. Any transparent or substantially transparent polymeric material with adequate electrical insulation properties and capable of positioning and adhering the encapsulated cholesteric liquid crystals, e.g., to the first and second electrodes, can be used. Suitable polymeric materials for this purpose include, but are not limited to, the following: acrylates and polyalkyl acrylates polyvinyl alcohol, gelatin, latex (natural rubber and synthetic rubber latexes), zein, polyethylene homo-and copolymers, polypropylene homo- and copolymers, etc. The encapsulated cholesteric liquid crystals can be associated intimately with the polymer matrix in a variety of ways. For example, the capsules can be deposited onto the polymer film, e.g., as a coating simply by spraying from a dispersion or emulsion of the encapsulated cholesteric liquid crystal material in a transparent polymeric binder. On the other hand, when the encapsulated cholesteric crystal material is to be incorporated into a polymer matrix, other procedures can be used. For example, the encapsulated material can be dispersed uniformly in an aqueous solution of the polymer (e.g., polyvinyl alcohol in water) and spread on the electrode surface. Alternately, the encapsulated liquid crystal can be spray dried and then mixed with a thermoplastic material before deposition of a composite film by draining or casting. Uniform distribution of the liquid crystal capsules can be secured by stirring the matrix polymer well before application or by other conventional mixing and distribution techniques. For such procedures, homopolymeric or copolymeric monoolefins (for example polyethylene, polypropylene, ethylene-propylene copolymers, and ethylene-propylene terpolymers with conjugated or nonconjugated $C_4$ to $C_6$ diene comonomers, can also be used. One satisfactory thermoplastic film matrix is "Lucite," which is a polymethyl methacrylate. Other conventional procedures for incorporating the capsules into the polymer matrix will be apparent to those skilled in the art.

Comparative tests between encapsulated cholesteric liquid crystal materials versus unencapsulated materials of identical composition reveal several important advantages for the encapsulated materials when employed in the articles of this invention. One of the major advantages of the encapsulated materials resides in the apparent prevention of crystallization of the liquid crystals and mixtures thereof. Hence, many cholesteric liquid crystal materials and mixtures are normally solid at room temperature. These mixtures often supercool considerably so that crystallization is not immediate at ambient room temperatures. However, they do crystallize within a day or a longer time period and must be reheated to the liquid crystal transition temperature range in order to be suitable for display, for example in chromatic image recognition use. The encapsulation of these mixtures seems to inhibit crystallization, and the cholesteric liquid crystal materials when encapsulated are observed to remain in the liquid crystal state for a longer period of time than the same materials when unencapsulated.

Another significant advantage attainable in the articles of the present invention is the ability of the encapsulated material to retain the third chromatic state for comparatively permanent periods of time versus the comparatively transitory retention of the third chromatic state in the case of unencapsulated cholesteric liquid crystals.

A further and equally important practical advantage of the encapsulated cholesteric liquid crystals is their ability to be used in multicomponent (multicolor) systems, viz, as coatings or incorporated in a matrix containing a plurality of different encapsulated cholesteric liquid crystalline mixtures, each mixture giving a characteristic color throughout the three chromatic states referred to hereinabove with the different mixtures being employed in close proximity so that a multicolored display is achieved in one, two or all three chromatic states. Moreover, polychromatic displays can be achieved by using a plurality of "switched" leads or contacts. In one case, some switches can be turned on and others left off which creates a polycolored effect using differently colored mixtures or one mixture. Another way to achieve such an effect is to use a plurality of mixtures each of which is responsive at a different level of intensity of field potential to exhibit a different apparent color or shade of color. Yet another way of achieving the polychromatic displays is to have some switches turned on and then turn a portion of them off so that some switches are on, and some switches are off (never having been turned on) some of which were previously on. This works well with a single cholesteric liquid crystal material, one mixture or a plurality of differently colored mixtures.

A still further advantage of the articles of the present invention include their processing flexibility in that a wider range of devices can be prepared to meet a wider range of specifications. For example, electric field sensitive display devices utilizing encapsulated cholesteric liquid crystals can be prepared to be either flat or curved, and either rigid or flexible. In the case of unencapsulated cholesteric liquid crystals, for all practical purposes they require two flat, rigid, evenly-spaced electrodes. Of course, these rigid requirements are not applicable to the encapsulated products because the individual minute capsule walls furnish the rigid, uniform support to the extent required. Yet another advantage attendant to the articles of this invention is that the encapsulation not only protects the cholesteric liquid crystalline material, e.g., from deleterious orientation and other adverse surface effects, but also substantially supplies a uniform thickness to the film thereof since the process of encapsulation provides the capsules in a condition of uniform diameter.

Some disadvantages attendant to the use of unencapsulated cholesteric liquid crystals include: the flow of such crystals between electrodes, the formation of bubbles due to the electrical breakdown of unencapsulated cholesteric liquid crystals; and nonuniform optical and electrical surface effects exhibited at the electrodes, viz, orientation at the surface of the cholesteric liquid crystalline film. Of course, these disadvantages can be avoided by use of the present invention.

The thickness of the cholesteric liquid crystalline member can range from about 0.001 to about 0.05 centimeters. Usually the film thickness of the cholesteric liquid crystalline member ranges from about 0.003 to about 0.01 centimeters and preferably from about 0.005 to about 0.01 centimeters.

FIRST ELECTRODE

While both electrodes can be composed of nontransparent material or presented in nontransparent from (note FIG. 3); it is usually preferable that the first electrode be transparent. In such cases the first electrode can be formed of any transparent electroconductive material. For practical considerations, it is usually desirable to form the transparent first electrode as thin as possible, in order to obtain a combination of maximum transparency and yet retain electrical continuity of the electrode. According to a preferred embodiment of this invention, the transparent first electrode can be composed of transparent metal or metal oxide films, coatings or other electroconductive layers. Suitable metal and metal oxide materials which can be employed for this purpose include, but are not limited to, the following: tin oxide, gold, platinum, chromium, nickel. In the case of metallic materials, transparent film can be made by using very thin homogeneous coatings or preparing a series of very thin, closely spaced ribbons of the metal by photoetching away 80 percent—90 percent or more of the material. A more comprehensive listing of suitable transparent metal and metal oxide electric conductive films can be found in U.S. Pat. No. 2,628,927 to Colvert et y al. the disclosure of which is is incorporated herein by reference. The deposition of the transparent electrode can be upon a protective inorganic, e.g., glass, or organic, e.g., acrylate or alkyl acrylate polymer plastic or other polymeric protective base material, which then constitutes the upper or viewing surface through which the encapsulated cholesteric liquid crystalline member's chromatic response to the electric potential is viewed. Various transparent plastic and resinous protective layers can be first provided with a transparent electroconductive layer by known coating or deposition techniques, such as, e.g., those indicated in any one of the following U.S. Pat. Nos. 2,704,265; 2,739,083; 2,740,732; 2,750,832; 2,758,948; 2,904,450; 2,907,672; 3,001,901 and 3,020,376. During assembly the transparent first electrode is placed in direct contact with the encapsulated cholesteric liquid crystalline member. Other suitable exemplary procedures for depositing electroconductive coatings upon the glass or plastic base include thermal sputtering or evaporative coating using metal halide solutions from a vacuum to which oxygen is then supplied in order to oxidize the metal halide salt and form the metal oxide film in situ upon the desired base material. Other satisfactory conventional are used when forming metal coatings, e.g., by chemical reduction, viz, coating a metal salt solution containing a reducing agent to reduce the metal salt to yield the metal film (one step procedure) or coating a metal salt onto the base, followed by a second coating using a solution containing a reducing agent (two step procedure), the latter procedure being similar to that used to form silver mirror films. Other satisfactory coating procedures will be apparent to those skilled in the art. When the first electrode is nontransparent, e.g., in the form of a thin, electron-emitting, resistive wire(s) as in FIG. 3; the wire(s) can be positioned so as not to obstruct or interfere substantially with the observed image.

SECOND ELECTRODE

The second electrode can be composed of any electroconductive material and need not be transparent; nor need it be coextensive with the first electrode throughout its entire extent. In fact, usually the second electrode is neither transparent nor coextensive with the first electrode. For example, the second electrode can be imposed in the pattern of a printed circuit or it can have any desired configuration. Hence, the second electrode can be deposited in transparent, nontransparent or partially transparent form, using such materials as copper, silver, gold, iron-containing metal alloys, carbon black, graphite, lead sulfide, etc.

In order to aid in viewing the chromatic representation produced upon the encapsulated cholesteric liquid crystalline member through the imposition of the electric potential thereto, it has been found desirable to provide an opaque, e.g., black contrasting background behind the encapsulated cholesteric liquid crystalline member, e.g., either in front of or behind the second electrode. The reason for this is that the chromatic change which the liquid crystals undergo is observable through light scattering, viz, the scattering of light through the strata of the liquid crystalline material. Hence, in order to observe the chromatic changes properly, it is most advisable to provide a black, light-absorbing background. That background can, itself, be an electrode, e.g., be prepared from black paints, black dye, etc., containing an electroconductive component such as carbon black or black anodized metal. The black background is not always necessary however. Note the description in conjunction with FIG. 5 in this respect.

In many cases (e.g., FIGS. 1, 2, 4 and 5), it is preferable to employ an insulating glass, plastic or other transparent or substantially transparent material as a protective layer on top of the transparent first electrode. Suitable materials from which this protective layer can be made include, but are not limited to, the following: Various types of glass and inorganic ceramics, such as conventional soda-lime silica glass; lithia-soda-lime-silica glass; potassia-soda-lithia-alumina-silica glass, various "organic glass" and other transparent organic polymeric materials, such as the methacrylate and alkylmethacrylate and alkylacrylate plastics, e.g., polymethylmethacrylates, polyethylmethacrylates, polymethylacrylates, polyethylacrylates, and other acrylic acid and methacrylic acid homo and copolymers. Other transparent or substantially transparent insulating protective materials suitable for use will be apparent to those skilled in the art.

In order to supply an electric potential to the first electrode and second electrode, it is practical and convenient to locate conductive elements (leads in electroconductive contact with both of said electrodes. Thus, one or more conductors will be located in direct contact with the first electrode and one or more other conductors will be in contact with and preferably located behind the second electrode. A protective layer of glass, plastic, or other electrically insulating material (not necessarily transparent) can be employed as a surfacing layer to protect that side of the article in close proximity to said second electrode and the conductive element(s) or leads in contact therewith.

ILLUSTRATIVE DEVICES

The present invention will be understood in greater detail in conjunction with the attached drawings.

Figure 1:
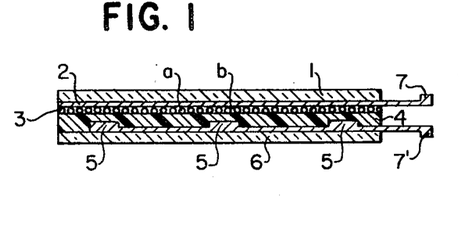
FIG. 1 of the drawings is a cross-sectional view through one embodiment of the present invention which illustrates a display device.

As shown in FIG. 1, transparent (glass or plastic) insulating protective layer 1 is directly in contact with transparent first electrode 2 which in turn is in intimate contact with the encapsulated cholesteric liquid crystalline member 3. The encapsulated cholesteric liquid crystalline member 3 is composed of an array or profusion of minute capsules, $a$ containing cholesteric liquid crystalline material incorporated in and/or on polymeric film $b$. In addition to enhancing the optical properties of the encapsulated liquid crystalline member and improving the adhesion between the capsule cell walls and the first and second electrodes; the polymeric film $b$ serves as an effective insulator between both of said electrodes. Next to encapsulated cholesteric liquid crystalline member 3 is located a black lacquer insulating film 4 to enhance the observation of the chromatic changes in the liquid crystalline member. Conductive elements 5 are located intermediate between lower protective layer 6 (usually glass or plastic) and black insulating film 4. While FIG. 1 shows three such conductors, it should be clearly understood that any desired number can be used and the configuration thereof can be arranged in any desired display pattern, sequence or shape. Upper and lower electrodes (leads) 7 and 7', respectively, allow the passage of an electric current from a suitable potential source (not shown) into electroconductive contact with both the first transparent electrode and the conductive elements 5. Upon subjecting the cholesteric liquid crystalline member to the electric field by completing the circuit; the chromatic representation viewed through the transparent layers of 1 and 2 will conform closely with the configuration defined by the field established between conductive elements 5 and the top electrode. That is to say that the configuration established by the elements 5 will be reproduced, but in different color or intensity of reflectance from the surrounding film areas when looking down through the transparent protective layer 1 and transparent first electrode 2. Upon opening the circuit, a further chromatic change takes place in the configuration areas wherein the encapsulated cholesteric liquid crystalline material rapidly changes from the second chromatic state to the third chromatic state characterized by the ability of the encapsulated cholesteric liquid crystalline member to retain a substantially permanent and different chromatic state for extended periods of time under normal atmospheric conditions of temperature and humidity. If desired, a sealer tape or potting compound (not shown) can be applied to the outer peripheral edge(s) to aid in sealing the various layers against lateral and interfacial exposure to the atmosphere at the peripheral edge surfaces.

Figure 2:
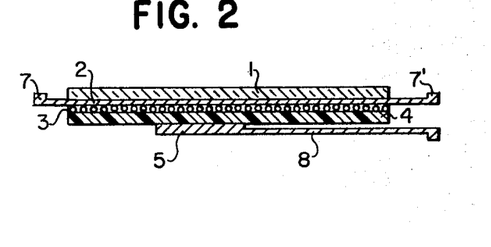
FIG. 2 is likewise a cross-sectional view of an article of this invention illustrating an alternative display device.

FIG. 2 illustrates an alternative display device and is comprised of transparent glass plate 1 in contact with transparent electroconductive film 2 which in turn is in contact with encapsulated liquid crystalline member 3, which is composed of a profusion of minute capsules containing the cholesteric liquid crystals present in and/or on the insulating polymeric film. Black insulating film 4 is deposited by coating on the encapsulated cholesteric liquid crystalline member 3 throughout its entire extent. Electroconductive film 5 (as deposited in any desired configuration to constitute for example a printed circuit or portion thereof) is deposited in intimate contact with black insulating layer 4. A conductor lead wire 8 is attached to or made integral with conductor film 5. Leads, 7 and 7', are attached to bus bars in contact with the transparent tin oxide electroconductive film 2 at the left- and right-hand sides, respectively, oxide electrode, Upon application of potential across the upper transparent electrode 2 and the lower electroconductive film 5 through the intermediate encapsulated cholesteric liquid crystalline member 3, the visual chromatic image corresponding to the configuration of printed circuit electroconductive film 5 appears to the viewer through the protective layer 1 and transparent electroconductive film 2, thereby exhibiting a colored image, the first, second (potential on) and third (potential off) chromatic states of which will depend upon the composition of the selected cholesteric liquid crystal material or mixtures thereof. On passing a current through leads 7 and 7' through the upper tin oxide electrode, the upper electrode can be heated to the isotropic transition temperature of the cholesteric liquid crystals thereby erasing the image produced during the third chromatic state. Upon cooling to ambient room temperatures, the liquid crystals then return to their original (first) chromatic state. Hence, it will be seen that this invention allows storage of information until desired followed by erasure followed by imposition of new, e.g., updated information all accomplished electronically on a one-shot basis without the necessity for continuous electronic output during either storage or erasure.

Figures 3, 4, 6:
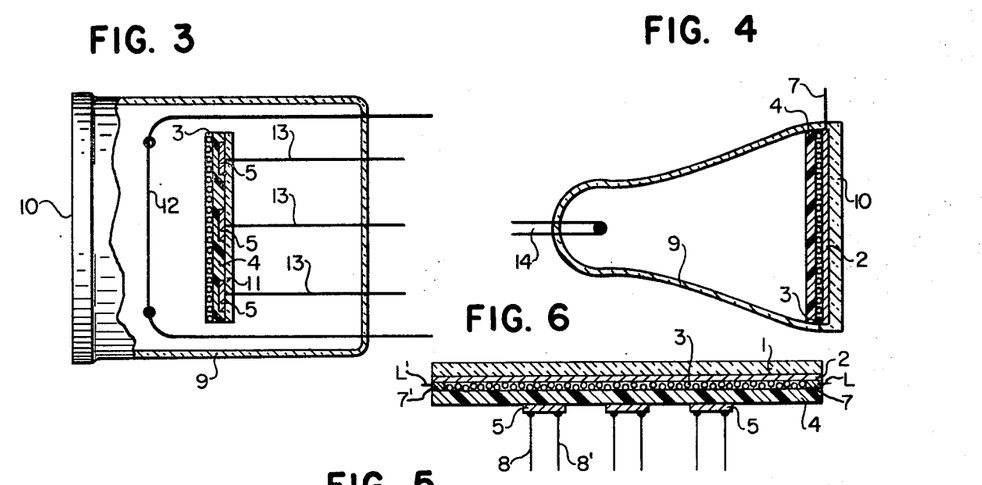
FIG. 3 is a cross-sectional view of a vacuum tube display device wherein the field is supplied by electrons drawn to the surface of the liquid crystalline member.
FIG. 4 is a cross-sectional view through a cathode-ray tube containing the structure of the present invention and serving as a display device.
FIG. 6 is a cross-sectional view of yet another device illustrative of this invention wherein both an electric field and thermal energy can be utilized to impose transient and/or comparatively permanent colored images on the same encapsulated cholesteric liquid crystal member. Optionally selected images can be stored and others erased. Transient images (imposed by heat) can be changed at will on a stored image background of contrasting color.

FIG. 3 illustrates an article of the present invention wherein the field is established by electrons attracted to the surface of the encapsulated cholesteric liquid crystal film. A matrix of conductive elements, 5, is supported on insulator, e.g., fiberglass substrate in a vacuum tube 9 with a transparent viewing port or faceplate 10. The conductive elements are held at a positive potential by means of connecting the leads 13 to a potential source (not shown). A current is passed through thin, nontransparent resistive wire 12, so that it is heated and emits electrons. The electrons are drawn to the surface of the liquid crystal film 3, directly over the positively charged conductive elements. The field formed between the surface electrons and the conductive elements causes the liquid crystal to change color. As shown here, three lead elements are used but it is possible to use any desired number and configuration of elements to describe the pattern desired. After the potential is removed from the elements, 5, the pattern will remain until erased by heating to the isotropic transition temperature. This can be accomplished by means of any suitable energy source, e.g., heat lamp, heat wires or passing a current through the conductive elements.

The device of FIG. 4 is a conventional cathode-ray tube envelope 9 (C.R.T.) with a transparent conductor 2 coated on the inner surface of the transparent faceplate 10. A film of encapsulated cholesteric liquid crystal (in a polymeric binder) 3 is coated in direct contact with the transparent electrode 2 on the inner surface of the faceplate, and a black insulator film 4 is coated on the liquid crystal film. The transparent electrode 2 is held at a positive potential via lead 7 and electrons from the electron gun 14 are caused by suitable deflection techniques to impinge on the black insulator in the desired pattern. The local fields set up between the electrons at the insulator and the front electrode cause the liquid crystal to change color in those areas forming a visual pattern when viewed from the front of the tube. The pattern is semipermanent and one sweep of the electron beam will suffice to establish a permanent image. This image may be erased by heating the liquid crystal above its isotropic transition temperature. A suitable means to do this would be to pass a current through the transparent electrode as described in the previous illustration.

Figure 5:
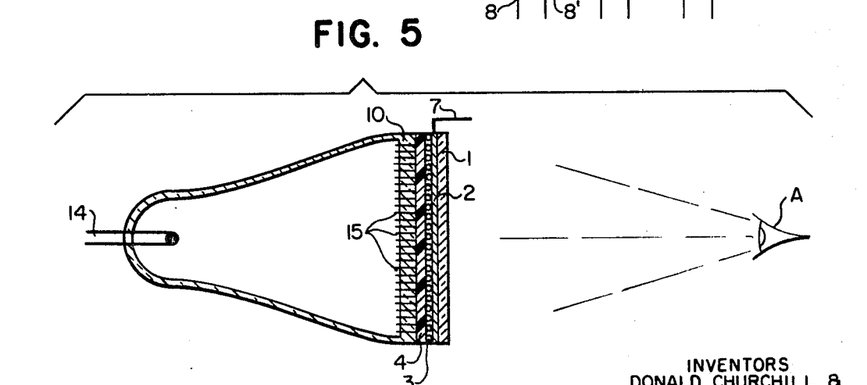
FIG. 5 is a cross-sectional view of an alternative form of cathode-ray tube utilizing the present invention.

In the device of FIG. 5 a conventional C.R.T. is prepared with a multitude of conductive wires, 15 extending through the faceplate 10 and flush with the outer surface on the faceplate. A black insulating film 4 is formed on the faceplate and the encapsulated liquid crystal film member 3 is coated on the insulator. A transparent protective outer plate 1 upon which a transparent conductive electrode 2 has been deposited is brought in contact with the liquid crystal film with the conductive surface in closest proximity to the liquid crystal member. The transparent electrode 2 is held at a positive potential via lead 7. The electrons from the electron gun 14 are deflected by any suitable conventional technique such that they describe a pattern on the inner surface of the C.R.T. faceplate. The electrons striking the wires 15 are drawn to the insulator film 4 and local fields are established across the liquid crystal film 3 between the charged wires 15 and the outer transparent electrode 2. The liquid crystal in these areas will demonstrate a color change visible to the viewing agency, A.

As previously stated, the black insulating layer is often used to absorb light transmitted through the liquid crystal film and thereby increase the contrast of the liquid crystal colors. This light absorbing layer is not always necessary for adequate contrast in this type of a C.R.T. display device however.

In the device of FIG. 6, transparent electroconductive coating 2, e.g., tin oxide, is deposited on transparent protective element 1, which also serves as a substrate or support for the coating. Bus bars 7, 7' are attached along the edges of coating 2 and have conductive leads L, L', respectively, attached thereto. Opaque, e.g., black, nonreflective insulator film 4 has a layer or film of encapsulated cholesteric liquid crystals (constituting an encapsulated cholesteric liquid crystal member 3) deposited thereon. Resistive conductor elements 5 can be deposited directly on insulator 4, or on a lower supportive and protective layer (not shown), such as layer 6 of FIG. 1. The encapsulated cholesteric liquid crystal member 3 is positioned in contiguous or closely spaced relationship to coating 2. Each resistive element 5 has a pair of leads 8, 8' attached thereto. thus enabling each resistive element 5 to be operable separately or in groups, e.g., by appropriate conventional switching. Resistive elements 5 can be formed, or deposited, in any desired configuration or design. The device of FIG. 6 has two primary modes of operation (A) and (B), as follows:

A. Field effect mode of operation with image storage and erasure;

An electric field is applied across the liquid crystal film by a potential applied to the top conductive coating 2 and any one or more of resistive elements 5. The liquid crystal transforms to the second chromatic state in the area of electric field imposition. After the field is removed; it assumes the third chromatic state in the areas over the resistive elements 5. These areas can be selectively "erased" by passing a current through the rear resistive elements, thereby heating the liquid crystal to the isotropic melt temperature. On cooling, those areas which had been heated return to the first chromatic state and a semipermanent (stored) pattern is displayed from the areas over the elements which were not thermally erased.

When it is desired to change the stored image; the remaining resistive elements can be heated or the entire display unit can be heated by passing a current through the top conductive coating 2 to effect erasure. This mode of operation is more complex for dynamic display but has the advantage that the field can be applied to all the resistive elements at one time and individual switches to these elements are not required.

B. Thermal mode of operation with storage option;

The device is operated thermally in the following manner:

An electric current is passed through the resistive element 5 by means of separate pairs of leads 8, 8' for each such resistive element. The heating of each element raises the temperature of the encapsulated liquid crystal directly above the element to the isotropic melting point. The heated portion becomes nonreflecting in contrast to the colored appearance of the unheated areas. When the current is interrupted, the element cools to ambient temperature and the liquid crystal returns to its initial colored (first chromatic) state. Thus different characters and designs (corresponding in shape and size to that of resistive elements 5) can be displayed in a transient manner.

When it is desired to store an image; one of the leads 8, 8' is connected to a high voltage source (not shown), and the other side of this source is connected to the transparent top electrode 2, through either of leads L, L' and their associated bus bars 7, 7'. A field generated across the liquid crystal film will cause a color change over the chosen resistive element 5; and when the field is removed, the electric field-induced colored image will remain in the third chromatic state.

Erasure of this image can be accomplished readily by heating the liquid crystal member to the isotropic melting temperature either by heating only those elements 5, which were used to generate the field or by passing a current through the top conductive coating 2, by applying a potential across leads L, L'. On cooling, the liquid crystal film returns to its original (first) colored state. Other operational modes will be apparent to those skilled in the art.

Hence it will be apparent that the device of FIG. 6 is, in effect, a display device having polychromatic capability for chromatically representing an optionally comparatively permanent (third chromatic state) yet thermally erasable configuration established by an electric field in optional conjunction with an independently operable yet thermally erasable transient, thermally operable, separate display means wherein said device comprises a transparent support 1; a transparent, electroconductive coating 2 on said support; conductive electrodes 7, 7' in contact with said coating and operatively connected by leads L, L'0 to an electric field source; an insulator film 4 having an encapsulated cholesteric liquid crystal member 3 in intimate proximity to said film and said coating; at least one electrically conductive resistive element 5 in thermally responsive association with said member, each said resistive element having a separate pair 8, 8' of conductive leads connected to a current source operable independently from said electric field source and wherein said encapsulated cholesteric liquid crystal member is chromatically responsive to both an electric field and thermal energy applied thereto.

ENCAPSULATION OF CHOLESTERIC LIQUID CRYSTALS AND FORMATION OF ENCAPSULATED CHOLESTERIC LIQUID CRYSTALLINE MEMBER

A wide variety of procedures can be employed to adequately prepare capsules and cholesteric liquid crystalline members containing the encapsulated cholesteric liquid crystals. The capsule diameters can vary from about 5 to about 100 microns or more, but usually capsule diameters range in size from about 10 to about 80 microns and preferably from about 10 to about 50 microns. The 20 to 40 microns size capsules are more preferred due to their uniform coatability, uniform color properties and resolution characteristics. The thickness of the cholesteric liquid crystalline member can range from the above-mentioned capsule diameters (as where no polymeric matrix or substrate is employed) to those situations wherein the capsules are incorporated into, coated onto, or otherwise associated within a polymeric film or matrix. In the latter cases, the average thickness of the encapsulated cholesteric liquid crystalline member can range from about 10 to about 500 microns. Usually, however, the average thickness ranges from about 30 to about 100 microns with a thickness of about 50 to about 100 microns being preferred for most display device uses. Of course, it is also within the purview of this invention to employ structures wherein a portion of the encapsulated cholesteric liquid crystal is totally incorporated in the polymeric matrix, another portion is coated onto the polymeric matrix and the remaining portion is embedded partially in the upper and/or lower surfaces of the polymeric matrix.

The preferred method of preparing capsules suitable for containing the cholesteric liquid crystalline materials which are chromatically responsive to electric potential is disclosed in U.S. Pat. No. 2,800,457 issued on July 23, 1957, to Barrett K. Green and Lowell Schleicher. While the aforementioned capsule preparation system is preferred, it should be understood that the capsule products employed in this invention can be obtained by any of the many later-developed encapsulation procedures which are capable of producing capsules of the required small dimensions. The final form of the capsular material to be coated is preferably 10 to 50 micron capsules, but it has been found that any size of capsules can be successfully utilized, the larger capsules only showing a decreased extent of visual resolution when used, e.g., in a data display system. While U.S. Pat. No. 2,800,457 discloses a pioneer invention concerning encapsulation on a minute scale, reference is also made to application for U.S. Pat. Ser. No. 591,023, filed Oct. 31, 1966, now U.S. Pat. No. 3,341,466 issued Sept. 12, 1967, which is a continuation of U.S. Pat. application Ser. No. 137,992, filed Sept. 14, 1961, by Carl Brynko et al., now abandoned, which patent discloses a procedure for making larger-than microscopic capsules. This same procedure is also disclosed in the corresponding British Pat. No. 935,812. As mentioned hereinabove, the encapsulated cholesteric liquid crystalline film layers appear to be free of the disadvantages associated with nonencapsulated exposed, continuous, e.g., wet, films of the same materials present in the liquid crystal state.

Layers cast from an emulsion of the encapsulated material and then dried are dry to the touch (although containing mostly liquid material); are relatively unaffected by brushing contact with foreign bodies; are substantially immune to solute contamination, e.g., absorption of extraneous vapor; and are not subject to rapid deterioration by selective nucleation crystallization; and, in cases when crystallization does begin, it is stopped from further areawise development by the boundary of a capsule wall. Encapsulated cholesteric liquid crystalline films, layers, coatings and other forms for the encapsulated cholesteric liquid crystalline member can be prepared by several methods. When the capsules are prepared according to the procedures disclosed in the above-named patents or by other procedures wherein the capsule cell raw material is tacky after manufacture and before drying; these capsules can be cast while tacky onto a substrate material as a slurry, with either the capsules preparation vehicle or other, selected, liquid as the slurrying vehicle. The capsule walls, being tacky while drying on the substrate, stick to each other and to the substrate without the use of an adder binder such as a polymeric film-forming material.

If desired, however, an added binder matrix of polymeric material can be used in manufacture of the encapsulated cholesteric liquid crystalline member, wherein capsules which contain the cholesteric liquid crystalline material are dispersed in a liquid solution of polymeric binder material, the solvent of which does not dissolve the capsule cell wall material, and the resulting dispersion is cast onto the substrate material and dried to yield a coated construction of capsules embedded in a polymeric binder film. The substrate can be of any conventional sheet material, including glass, and a polymeric material can be used as a substrate. The polymeric substrate can be of the same kind as that of the binder material or not, as desired or required by the intended end purpose. Binder material useful in the practice of this invention should be at least translucent and more usually substantially transparent in order for light, incident to the display films, to be transmitted therethrough to and from the cholesteric liquid crystalline material.

A dispersion of the encapsulated liquid crystal material in a liquid solution of film-forming binder material need not necessarily be cast permanently onto a substrate. Such a dispersion can be cast onto a support and dried, so that the resulting film or layer of capsules embedded in binder material is strippable or otherwise separable from the support to yield a self-supporting, encapsulated cholesteric liquid crystalline member having capsules more or less evenly distributed throughout.

Another feature of the incorporation of encapsulated cholesteric liquid crystalline materials into a system to provide an electric potential-activated sensing or display device is the utilization of a mixture of capsules, as to size and content, for indicating and/or displaying a wide range of specific levels of electric potential. Such a system, in one case, can comprise a plurality of layers, each layer comprising one, two or more types of capsules having different mixtures of chromatically responsive cholesteric liquid crystalline materials. These devices can be adjusted to accomplish the desired task by adjustment of characteristics imparted thereto by any one of the following adjustments: (a) electric field response range; (b) size of the liquid crystal core; (c) type and thickness of the capsule cell wall material; (d) specific composition of the cholesteric liquid crystalline material, and the like, all to the purpose of choosing a response suitable for a given proposed use.

In accordance with this invention capsules can be prepared which contain from about 50 to about 99 wt. percent of cholesteric liquid crystal material with the remainder being cell wall material. Usually, however, the internal phase represents from about 80 to about 95 wt. percent of the total capsule weight.

It is also within the purview of this invention to employ a coloring material to tint the capsule cell wall color. The capsule cell walls thus colored would serve not only as liquid crystal containers but also as color filters for the light traveling to and from the encapsulated cholesteric liquid crystalling materials. Capsule cell walls are easily tinted by any stain capable of coloring the gelatin-gum arabic or other cell wall material selected for use. Such a controlled system would find use in display devices and other devices where the broad spectrum iridescent effect (that obtained from the incident light emanating from the encapsulated cholesteric liquid crystalline member) is objectionable for certain uses.

A wide variety of encapsulating (external phase materials) can be employed to encapsulated the cholesteric liquid crystals in accordance with this invention. Such suitable materials include those referred to hereinabove in said U.S. Pats. patent applications and said British Patent. Usually the encapsulating material is one or a combination of the following: A gelatin-gum arabic system, a polyvinyl alcohol-based system, a vein-based system, or a urea-formaldehyde-based system.

The present invention will be illustrated in greater detail in the following examples which are includes herein for illustrative purposes and should not be interpreted as limiting the present invention.

All percents and parts are be weight unless noted otherwise.

EXAMPLE 1

A typical illustrative embodiment of the present invention was prepared in the configuration of the article shown in FIG. 1 and containing an encapsulated cholesteric liquid crystalline mixture. The mixture contained 70 wt. percent of cholesteryl nonanoate, 25 wt. percent of cholesteryl chloride and 5 wt. percent of cholesteryl cinnamate. Capsules having average diameters ranging from 10 to 30 microns were prepared from the above-mentioned mixture by the below-described procedure using gelatin and gum arabic hardened by glutaraldehyde as the capsule cell wall material.

The encapsulation procedure was conducted on the above-mentioned cholesteric liquid crystalline mixture by stirring 1.25 grams of acid-extracted pigskin gelatin, having a Bloom strength of 285 to 305 grams, and an isoelectric point of pH 8-—9, and 1.25 grams of gum arabic with 125 grams of distilled water at 55° C. in a Waring Blendor to yield a solution which was at about pH 4.5. When the solution was formed, the pH was adjusted to 6.0 by the drop-by-drop addition of 20 percent by weight aqueous sodium hydroxide solution. To the above system was added a solution of 2 grams of the cholesteric liquid crystalline mixture. The cholesteric liquid crystalline materials were emulsified in the Waring Blendor vessel to an average droplet size of 10 to 30 microns, and the pH of the system was slowly reduced by the dropwise addition of 14 percent, by weight, aqueous acetic acid solution. Addition of acid was continued until the single, liquid-walled, capsules clustered to form aggregates having diameters of about 25 to 100 microns. At this final state, the system pH was about 5.

The entire liquid system was then chilled with an ice bath to below 10° C, while the agitation was continued. At 10° C, 0.6 milliliter of a 25 percent, by weight, aqueous solution of glutaraldehyde, a chemical hardening agent for the gelatin, was added to the Blendor vessel, and the system was stirred for about 15 hours while slowly returning to room temperature. At the end of that time, the capsule walls were firm and hardened, and the capsular system was poured through a wire mesh sieve having openings of 74 microns. That which passed the screen was suitable for coating the intended substrate. Prior to coating the encapsulated cholesteric liquid crystal mixture onto the glass slide, the capsules were concentrated by filtration and a small amount, viz, 10 weight percent, based on total slurry, of polyvinyl alcohol was added to improve the adhesion of the capsules to the substrate upon coating thereof. Tantalum conductive elements were deposited by a conventional vacuum evaporation procedure onto the bottom glass slide. Then a commercially available black insulating lacquer, "Spray On No. 6223008" which contains carbon black in an insulating binder matrix, was sprayed on the bottom glass plate on top of the previously deposited Tantalum elements to furnish the dark substrate necessary for effective liquid crystal iridescent (incident light) observation. The above prepared encapsulated cholesteric liquid crystal mixture was then coated in the form of a polyvinyl alcohol film in a thickness of approximately 80 microns onto the black lacquer; and after drying thereof, a previously tin oxide-coated glass plate was attached thereto with the conductive surface adjacent to the encapsulated cholesteric liquid crystalline member (film). The top glass plate had a tine oxide coating having a thickness corresponding to a resistivity of approximately 100 ohms per square. A pair of electrodes were provided such as those indicated at 7 and 7' in FIG. 1 with electrode 7 being the upper electrode supplying electric potential to the transparent tin oxide electrode and the lower electrode 7' connected to one or more of the conductive elements 5 deposited upon the lower glass slide 6. After drying of the above films, the top plate with the transparent tin oxide conductive film was secured to the bottom plate containing the encapsulated cholesteric liquid crystal member by taping thereto. The resistive elements on the lower glass plate were connected through a common lead to a source of direct current potential.

When the direct current potential was applied across the electrodes, the reflectance from the areas over the lower elements when viewed with incident white light shifted from green (the first chromatic state) to a blue-black coloration (the second chromatic state). The black portion of the reflectance could be due to a shift of the wavelength maximum into the ultraviolet region of the electromagnetic spectrum. In any event, after the electric field was removed, the reflectance did not return to the original green color, but instead assumed a great appearance (third chromatic state) which was in very good chromatic and configurational contrast to the green background areas which were not subjected to the field.

Separate visual resolution tests of the third chromatic state from the first chromatic state reveal sufficiently high resolution to clearly outline thin 200 micron wide evaporative gold strip leads to the resistive elements.

On reapplication of the electric field, that area of the encapsulated cholesteric liquid crystalline member through which the field passed instantaneously turned to the blue-black color (second chromatic state).

Repeated, extensive cycling of the current on and off clearly demonstrated that the encapsulated cholesteric liquid crystal member possessed the ability to be cycled for extended periods without any sign of breakdown or loss of clearly discernible color contrast between the first second and third chromatic states. In this regard comparative stability tests were conducted to determine the length of time that the third chromatic state (grey color) for the above encapsulated mixture of cholesteric liquid crystalline materials would endure compared with an unencapsulated mixture of the same composition. The third chromatic state color stability test, conducted on the article of FIG. 1 as produced in accordance with this example, failed to reveal any fading of color or reflectance intensity change induced upon the third chromatic state simply by allowing it to stand at ambient room temperatures and humidity conditions for eight weeks. On the other hand, the article containing the unencapsulated cholesteric liquid crystal mixture, prepared in essentially the same manner, gradually returned to its original first chromatic state (green color) over a one-day period. Hence the conclusion drawn is that the third chromatic state is fairly permanent in the articles containing the encapsulated cholesteric liquid crystals since it failed to fade or change in any manner discernible to the naked eye over a period of eight weeks.

With further samples of the same article produced as indicated herein, the information present in the display device (viz, the differently colored areas produced by the electric potential) was erased totally by application of heat to attain the isotropic melting point of approximately 80° C., thus regenerating the entire film to its original green color (first chromatic state) when cooled again to room temperature. Another way of regenerating the film is to regenerate it selectively by application of the heat or an electric current of sufficient intensity to raise the temperature to the isotropic melting point of the liquid crystal mixture in selected areas only. In such a case, electrical current is passed through those resistive elements whose chromatic representation or image is to be erased, causing the elements to be heated to the isotropic transition temperature. Hence, the erasure of the chromatic image can be general (to regenerate the entire film) or selective to a particular area thereof. The electroconductive force or potential levels required to secure the second chromatic state and erasure of the third chromatic state will depend mainly upon the thickness of the encapsulated cholesteric liquid crystalline member and the spacing of the conducting electrodes. A potential of 600 volts was sufficient to bring about the second chromatic state with a film thickness of the encapsulated cholestric liquid crystalline member of approximately 80 microns. The system has been operated with a 60 cycle alternating current potential and similar results are observed. Erasure can be achieved readily for 20 to 100 micron thick encapsulated cholesteric liquid crystalline members by applying a potential of 100 to 500 volts across the tantalum elements to heat the elements to the isotropic melting point of a given liquid crystal mixture. The polyvinyl alcohol used in this Example was "Elvanol 71—24" as sold by E. I. duPont deNemours & Company, Inc., Wilmington, Delaware, United States of America, and was characterized by the fact that (a) a 4 percent, by weight, aqueous solution of the material exhibited a viscosity of 23 to 28 centipoises at 25° C., and (b) the material was 97.7 to 98.4 percent hydrolyzed; i.e., that specified percentage of acetate or other chemical groups originally present in molecules of the subject material have been converted to hydroxyl groups.

EXAMPLE 2

The procedure of Example 1 was repeated except using a mixture of cholesteric liquid crystalline materials containing 73 weight percent cholesteryl nonanoate and 27 percent cholesteryl chloride. The gelatin-gum arabic capsules had average diameters of approximately 30 to 50 microns. Upon application of the electric field a color change of from red (first chromatic state) to dull grey (second chromatic state) was observed. It should be noted here that the comparatively small amount of heat generated due to application of the electric field was insufficient to cause the liquid crystal to become liquid. Upon turning off the current, the color instantaneously changed from dull grey (second chromatic state) to a dull red (third chromatic state). This third chromatic state was sufficiently sharp in contrast to that of the first chromatic state to enable clear distinction thereof to the naked eye. The third chromatic state remained for an observed period of two weeks. After the expiration of this period of time, the encapsulated cholesteric liquid crystal film was regenerated by radiant heating and upon cooling to room temperature returned to its original red colored state.

EXAMPLE 3

The procedure of Example 1 was repeated that the cholesteric liquid crystalline material encapsulated was a mixture containing 79 weight percent of cholesteryl nonanoate, 14 percent of cholesteryl chloride and 7 weight percent of oleyl cholesteryl carbonate. The average capsule diameter of the encapsulated mixture was in the range of 20 to 40 microns. The film thickness was 80 microns. Upon application of an electric potential of 100,000 volts per centimeter thickness of the encapsulated cholesteric liquid crystalline member, the observed color of the cholesteric liquid crystalline mixture changed from green (first chromatic state) to blue (second chromatic state). Upon removal of the electric field by shutting off the current, the third chromatic state was instantaneously experienced, which was a grey-green color of sufficiently sharp contrast to that of the first chromatic state to be readily observable to the naked eye.

EXAMPLE 4

Twenty-five copper plates 1 cm. × 2 cm. × 0.25 cm. were bonded to a plastic substrate in an evenly spaced 5 row—5 column matrix. Each of the plates was soldered to a conductive lead wire extending through the substrate. The copper plates were sprayed with an insulating black lacquer and a layer of encapsulated liquid crystals prepared for Example 3 was coated on the lacquer to a thickness of about 100 microns.

The matrix was mounted in a vacuum chamber which was equipped with a transparent plastic port (window) such that the liquid crystal film was readily visible through the port. The conductive lead wires were connected to vacuum tight electrical feed-throughs in a plate at the opposite end of the vacuum chamber from the transparent port. A tungsten wire was mounted about 2 inches in front of the matrix (as noted, e.g., in FIG. 3) and was connected to a DC power supply.

The chamber was pumped down to 1 ×10 −6 Torr vacuum and a current of about 3.5 amps was passed through the tungsten wire causing it to glow red. When selected plates in the matrix were charged to a positive potential of 700—1500 volts, the electrons emitting from the hot wire were attracted to the surface of the encapsulated liquid crystals coated on the charged plates and the electric field established between the surface electrons and the plate caused the liquid crystals to change shade of color from green to dark grey-green. When the field was removed by removing the potential from the plate, the image persisted but in a readily discernible different shade, viz, lighter grey-green.

EXAMPLE 5

A liquid crystal display utilizing a conventional cathode-ray tube (C.R.T.) output is prepared in the following manner. The target face of the tube is coated on the interior surface with a transparent electrode. A film of field responsive encapsulated cholesteric liquid crystal material (as in Example 3) is coated in contact with the transparent electrode as shown in FIG. 4. A black insulating lacquer film is sprayed on the interior surface of the liquid crystal film. As mentioned previously, the black film is used to absorb light transmitted through the liquid crystal film in order to enhance the contrast of color or shade of color scattered from the liquid crystals.

Inasmuch as the liquid crystal is not in contact with another reflective surface on its interior surface (when used in a C.R.T.), it is probably not necessary to have this black insulator film with this device.

After coating of the film, the tube is pumped down to suitable vacuum and can be operated as a conventional video tube. The transparent electrode on the face plate is held at a positive potential and the electron beam is caused to trace the desired pattern on the liquid crystal film.

The local fields set up between the electrons trapped at the interior surface of the liquid crystal (or black insulator) and the positively charged transparent electrode cause the liquid crystals to change color in those areas and from a visible pattern which may be observed through the faceplate and the transparent electrode. The pattern is optionally permanent, viz, subject to erasure, and one sweep of the electron beam will suffice to establish the image. This image can be erased generally or selectively (in certain areas thereof) by heating the liquid crystal to its isotropic transition temperature. The color shade changes are the same as noted above in Example 4.

Since the mechanism requires only that the electrons be deposited on the liquid crystal surface, the electron beam can be of much lower energy than normally required for stimulation of a phosphor (most often used for C.R.T. imaging)

The liquid crystal image depends on reflected light and therefore is best observed under strong exterior illumination— a condition under which the standard phosphor coating is of marginal performance. Hence, strong color contrasts are achievable with the present invention in strong daylight versus very weak color contrasts with conventional phosphors at the same conditions.

EXAMPLE 6

This device is similar in many respects to that described under Example 5 except that the liquid crystal film is applied to the exterior of the C.R.T.

The faceplate of the C.R.T. is prepared with a matrix of closely spaced conductive wires imbedded in it with one end of the wires exposed to the interior of the tube and the other end flush to the exterior surface of the faceplate, as shown in FIG. 5. The exterior surface is painted with a black insulating film if desired, and then a film of encapsulated cholesteric liquid crystal (as in Example 3) is coated on the black insulator.

A transparent plate with a transparent electrode coated on its surface is attached to the tube with the conducting surface in contact with the encapsulated cholesteric liquid crystal film.

The transparent electrode is charged positively and the C.R.T. is operated in a conventional manner such that an electron beam strikes the wire ends extending through the faceplate in the pattern desired. The electrons are conducted through the individual wires of the faceplate to the surface of the encapsulated cholesteric liquid crystal film which a color change in the areas between the wires which have been charged by the electron beam and the positively charged transparent electrode in the same manner as noted above in Example 4.

While the above Examples illustrate the invention in great detail; it should be understood that the present invention in its broadest aspects is not necessarily limited to the specific materials, conditions, and structural embodiments set forth therein.

We claim:

1. An article of manufacture comprising a pair of spaced electrodes and located therebetween an encapsulated cholesteric liquid crystalline member chromatically responsive to the electric field imposed due to said electrodes.

2. An article as in claim 1 wherein said electric field ranges from about 10,000 to about 1,000,000 volts per centimeter of thickness of the encapsulated cholesteric liquid crystalline member.

3. An article as in claim 1 wherein one of said electrodes is substantially transparent.

4. An article as in claim 3 which includes an opaque contrasting background located behind said encapsulated cholesteric liquid crystal member.

5. An article as in claim 4 which includes a substantially transparent protective covering for said substantially transparent electrode.

6. An article of manufacture as in claim 1 wherein said encapsulated cholesteric liquid crystalline member comprises a profusion of individual capsules each containing cholesteric liquid crystal material intimately associated with a substantially transparent polymeric matrix.

7. An article as in claim 6 wherein said capsules are uniformly distributed within said polymeric matrix.

8. An article as in claim 6 wherein said capsules have diameters ranging from about 5 to about 100 microns.

9. An article as in claim 6 wherein said capsules contain from about 50 to about 99 weight percent cholesteric liquid crystal material, based on total capsule weight.

10. An article as in claim 6 wherein the average thickness of said encapsulated liquid crystalline member ranges from about 10 to about 500 microns.

11. A display device for chromatically representing a configuration established by an electric field comprising a first electrode and a second electrode spaced therefrom, said first electrode being closer to a viewing agency than said second electrode, and an encapsulated cholesteric liquid crystalline member located between said electrodes and chromatically responsive to said electric field said member comprised of a profusion of individual capsules each containing cholesteric liquid crystal material intimately associated with an insulating polymeric matrix.

12. A display device as in claim 11 wherein said first electrode is substantially transparent.

13. A display device as in claim 12 wherein said substantially transparent first electrode has a substantially transparent protective covering.

14. A display device as in claim 11 which includes an opaque contrasting background located between said encapsulated cholesteric liquid crystalline member and said second electrode.

15. A display device as in claim 14 wherein said capsules are uniformly distributed within said polymeric matrix.

16. A display device having polychromatic capability for chromatically representing an optionally comparatively permanent yet thermally erasable configuration established by an electric field in optional conjunction with an independently operable yet thermally erasable transient, thermally operable, separate display means, said device comprising a transparent support; a transparent electroconductive coating on said support; conductive electrodes in contact with said coating and operatively connected by leads to an electric field source; an insulator film having an encapsulated cholesteric liquid crystal member in intimate proximity to said film and said coating; at least one electrically conductive resistive element in thermally responsive association with said member, each said resistive element having a separate pair of conductive leads connected to a current source operable independently from said electric field source and wherein said encapsulated cholesteric liquid crystal member is chromatically responsive to both an electric field and thermally energy applied thereto.

17. A display device as in claim 16 wherein said insulator film is opaque.